United States Patent [19]

Rayment et al.

[11] 4,104,505
[45] Aug. 1, 1978

[54] METHOD OF HARD SURFACING BY PLASMA TORCH

[75] Inventors: Larry W. Rayment, Battle Creek; Thomas S. Kilbourn, Richland, both of Mich.

[73] Assignee: Eaton Corporation, Cleveland, Ohio

[21] Appl. No.: 736,296

[22] Filed: Oct. 28, 1976

[51] Int. Cl.² .............................................. B23K 9/04
[52] U.S. Cl. ............... 219/76.16; 219/121 P; 219/123; 219/160
[58] Field of Search ............. 219/76, 121 P, 123, 219/160, 76.16

[56] References Cited

U.S. PATENT DOCUMENTS

| 2,357,170 | 8/1944 | Burggraf | 219/160 |
| 2,920,183 | 1/1960 | Greene | 219/123 |
| 3,283,205 | 11/1966 | DeBolt | 219/123 |
| 3,743,815 | 7/1973 | Woods | 219/76 |

FOREIGN PATENT DOCUMENTS

| 2,158,547 | 11/1972 | France | 219/121 P |

*Primary Examiner*—E. A. Goldberg
*Attorney, Agent, or Firm*—R. J. McCloskey

[57] ABSTRACT

The plasma torch of this disclosure provides a shielded plasma arc using an external powder feed and an inert gas shield. The torch of this disclosure has a smaller outside diameter than prior art torches and allows better orientation of the torch with respect to a substrate to be hard faced. A method of hard surfacing an article, preferably using the torch of this invention, is also disclosed. The rotation of the article, a valve body, is controlled during hard facing to prevent deflects.

8 Claims, 2 Drawing Figures

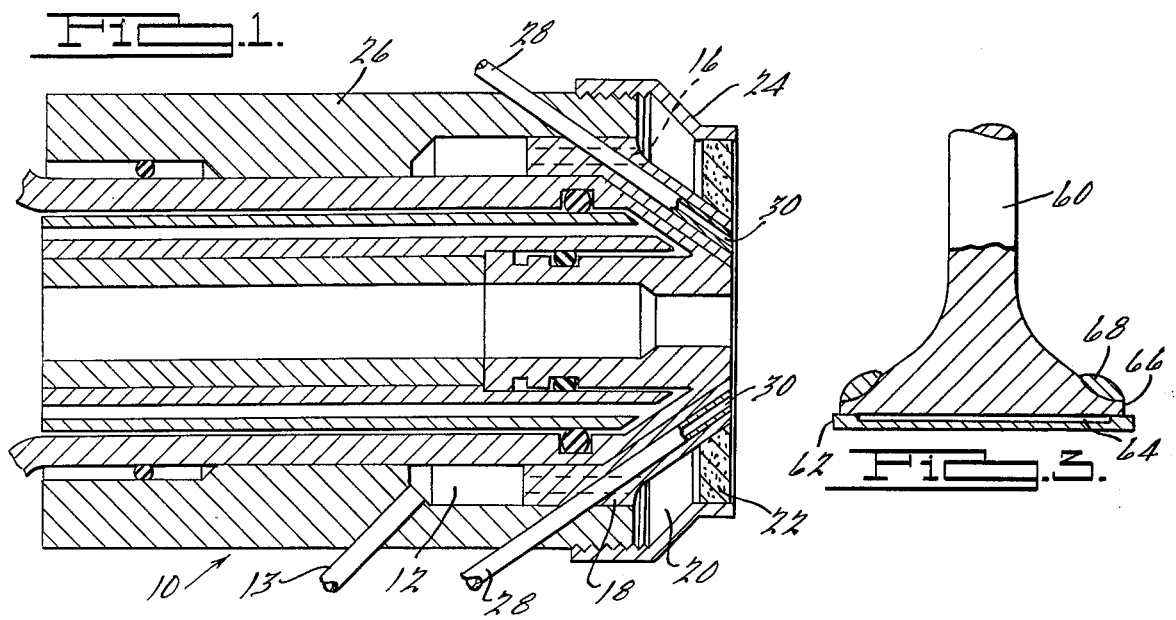
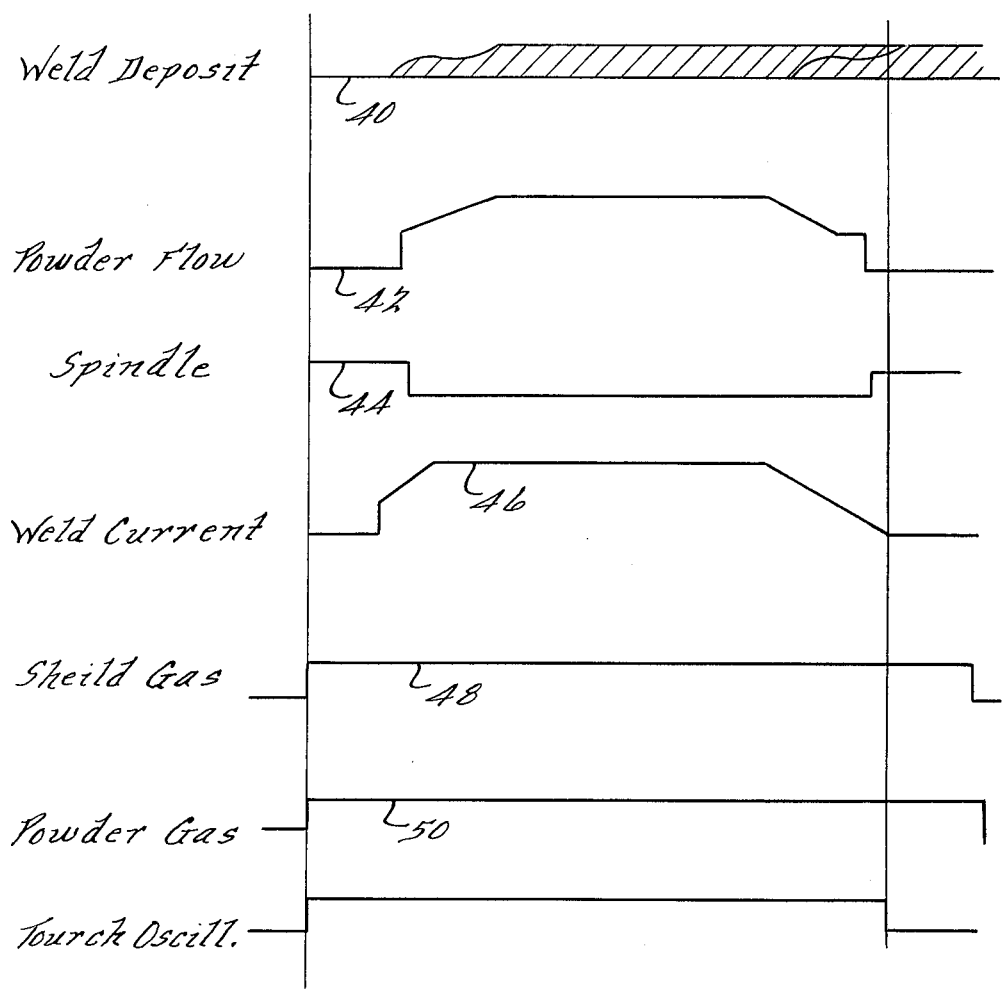

METHOD OF HARD SURFACING BY PLASMA TORCH

BACKGROUND OF THE INVENTION

1. Field of the Invention

In one aspect this invention relates to torches for plasma arc hard facing. In another aspect, this invention relates to methods of hard surfacing substrates to provide a hard wear resistant coating for service at elevated temperatures, such as service requiring direct contact with engine exhaust gases.

2. Description of the Prior Art

One commonly used plasma arc torch feeds a powder into the center of the torch along its longitudinal axis by means of an inert gas (such as helium). Simultaneously an inert gas such as argon or helium is formed into an ionized plasma by passing the inert gas through an electric arc after which the powdered material and the plasma are combined. The resulting plasma carries and melts the powdered material which exists from the torch and is directed towards an article to be hard surfaced. In general, it is also desirable to have a constant flow of a shield inert gas such as argon or helium about the plasma to prevent oxidation of the molten metal.

In the conventional plasma arc torch there are tortuous turns in the powder's path which allow the powder to plug the torch passages. Consequently, the metal is not fed into the plasma in an even, controlled manner. This design must use the same inert gas for a powder carrier as used to establish the main plasma.

To correct the problem caused by the tortuous path of center feed torches, external feed torches have been developed wherein a powdered material carried by an inert gas is fed into the plasma stream at a point outside the torch. The external feed nozzles minimize plugging by reducing convolutions and tortuous turns in the powder passages especially within the torch. This torch allows the use of a different gas for a powder carrier than that used to establish the main plasma. However, such external feed nozzles have resulted in a new set of problems. One problem is that the resulting nozzle has a large diameter. Large nozzles create problems when hard surfacing shaped work pieces such as engine poppet valves since the nozzle cannot be properly oriented with respect to the work piece. Indeed, some pieces may be impossible to hard face. In addition, a portion of the shaped work piece will often come into contact with the shield gas envelope which results in distortion of the shield and possible degradation of the deposited hard facing. Further, the shaped work piece can also come into physical contact with the torch body which results in shorting the path of the electrical current with subsequent weld defects or damage to the torch.

SUMMARY OF THE INVENTION

It is an object of this invention to produce a smaller diameter torch which contains the optimum feed characteristics of an external powder feed plasma torch.

It is a further object of this invention to provide a torch with a smooth laminar flow of shield gas which protects the weld.

It is a further object of this invention to provide a method of welding using plasma arc torch which produces a smooth weld overlap when the weld bead is formed into a continuous circumferential strip.

Briefly, the plasma torch of this invention will have an electrode for producing a plasma arc contained within the torch and means for feeding a powdered hard facing material, to be deposited on a substrate, into the plasma at a point remote from the torch body. Shielding means provides a smooth flow of inert gas around the weld pool. In the improved torch of this invention, a shield gas is fed to a first plenum within the torch, said plenum being adapted to receive and pressurize the inert shield gas. The shield gas passes through a baffle located behind the point at which the powder is fed into the plasma. The shield gas and powder carrier gas are not in fluid contact. The gas exiting from the plenum travels via the baffle to a second plenum. The second plenum exhausts the shield gas, through a diffusion member, about the plasma exiting from the torch to provide a smooth cylindrical shield about the plasma and molten hard facing deposit.

BRIEF DESCRIPTION OF THE DRAWINGS

In the accompanying drawing:

FIG. 1 is a cross section of a plasma torch of this invention;

FIG. 2 is a diagrammatic representation of a surfacing method showing the variables of the welding method as a function of time; and FIG. 3 is a cross sectional view of an engine poppet valve being hard surfaced using the torch and method of the above invention.

DETAILED DESCRIPTION OF THE PREFERRED EMBODIMENTS

Referring to the accompanying drawing and initially to FIG. 1 which discloses a torch head of the present design. A torch head suitable for plasma hard facing is designated generally 10. The torch head 10 is adapted so that an inert shield gas, such as argon or helium, is admitted to a first annular plenum chamber designated generally 12 contained in a torch body 26, via line 13. As the shield gas enters the first annular plenum chamber 12, it is slowed down and repressurized, the annular plenum distributing the shield gas evenly about the centerline of the torch head. After the shield gas is pressurized, it enters a series of bores designated generally 16 which are radially spaced about the periphery of a baffle plate 18. After the shield gas passes through the bores, it enters a second annular plenum chamber designated generally 20. This second annular plenum chamber 20 again allows the shield gas to become evenly distributed and pressurized. The shield gas then moves through a diffuser plate 22 forming a slender cylindrical shield of inert gas which is radially disposed about the longitudinal axis of the torch 10.

The diffuser plate 22 is held on the body of the torch by any convenient means such as threaded collar 24 which engages a mating threaded portion on torch body 26. The diffuser plate can be made of numerous porous materials which provide a substantially uniform porosity and present a substantially uniform surface area to the flow of the gas. One acceptable diffuser plate has been found to be a sintered porous brass annular ring having a means free surface area of approximately 50%.

The electrode mechanism for forming an arc and the systems for introducing an inert gas into the arc to form a plasma is well known in the art. Further detail will be omitted in the interest of brevity.

For the purposes of illustration, one acceptable arc producing mechanism is that available from the Linde Division of Union Carbide and described as PT-9 hard surfacing torch which can be fitted with either the standard duty or heavy duty front end assemblies. This torch is described in greater detail in their advertising service bulletin, The Linde Advertising Brochure No. 11-724-B.

A further description of one suitable arc producing mechanism can be found in U.S. Pat. No. 2,806,124, specifically beginning at column 4, line 20, et seq. A further detailed description of the plasma producing mechanism is omitted since such details are not part of the present invention.

In the torch of the present invention, a mixture of powdered material to be applied as a hard facing and an inert carrier gas, e.g. argon, is introduced into the torch via line 28. The powder-gas mixture passes through the baffle 18 in bore 30 which then directs the gas-powder mixture at an angle of about 35° to the arc. The angle of the mixture is such that the gas-powder mixture will impinge the plasma arc at a point within the shield formed by the inert shield gas moving axially outward from the diffuser plate. The direction of the gas-powder mixture forces the gas-powder mixture into the plasma at a point approximately ⅜ inch beyond the end of the torch. The gas-powder mixture is not subject to constrictions within the torch and consequently flows freely, smoothly and at a uniform rate. The exact angle at which the powder-gas mixture impinges on the plasma and the exact position will vary. However, the powder-gas mixture always impinges on the plasma outside the torch head.

Turning to FIG. 2, the figure discloses in graphic form several variables useful in the practice of the method of this invention. The variables are plotted for hard facing the peripheral seating surface of a valve having a 1.5 inch diameter, that is a circumference of approximately 4.7 inches. The entire cycle time was approximately 28 seconds. The first diagram 40 shows a representational cross section of a weld made using the conditions shown in the graphs below the diagram. The powder flow line 42 shows the powder entrained in the inert gas. The average powder flow is approximately 20 grams/minute. Spindle speed 44 basically relates to the rotational speed of the fixture on which the valve is mounted and turned during the surfacing cycle. The weld current line 46 shows a current range of approximately 0 to 110 amperes. The shield gas line 48 shows the flow of shield gas, such as argon, the average flow being approximately 50 cubic feet per hour. The powder gas 50 such as helium, line shows the flow of the powder carrier gas with a maximum of 12 cubic feet per hour and the magnetic force arc oscillation with controlled amplitude, frequency, and dwell time remains constant during the total weld cycle. This arc movement perpendicular to the weld bead controls the distribution of heat and hard facing material precisely over the area of the substrate to be hard faced.

To make the weld cross section shown, which represents a depth of approximately 0.060 inches; the weld current is brought from 0 to 110 amperes in a 5 second period. The workpiece is rotated initially at a high rate of 6 RPM to allow the arc to transfer and stabilize while preventing defects in the substrate when the transferred arc is established. The shield gas envelope is established along with a flow of powder carrier gas, however, no powder flow is present. After approximately 2 seconds of arc transfer and stabilization, the work piece rotation is reduced to about 3 RPM. Simultaneously, the powdered hard facing material begins to flow at an initial rate of approximately 6 grams/minute. The weld current and powder flow are simultaneously increased in a linear fashion over approximately a 5 second period to a maximum current of 110 amperes and maximum powder flow rate of 20 grams/minute. This provides a gradually upsloping weld bead with a relatively smooth surface on the valve substrate. The desired thickness of weld material, about 0.060 inches, is deposited on the substrate and continued at that rate until the spindle has made virtually a complete revolution.

At this point the weld bead thickness is reduced to blend into the beginning of the weld bead, forming a smooth continuous circumferential weld bead. The powder flow is reduced in a linear fashion to a rate of approximately 5 grams/minute over a 2 second period. Simultaneously, the weld current is decreased in a linear fashion over approximately a 3 second period. Near the end of the facing cycle, the powder flow is terminated completely, the spindle speed is increased to 6 RPM, and the transferred arc is allowed to continue the gradual decrease and is finally extinguished at the end of the cycle.

The result of this process is overlapped weld joint free from internal and external weld defects and is metallurgically bonded to the underlying substrate. Because of the intense heat and rapid cooling, there is only a minor amount of intermix in the fusion zone. Due to the rapid termal dissipation in the overlay, the hard facing material will have a fine grain structure with evenly dispersed carbides throughout.

FIG. 3 shows a valve cross section surface using the torch and method of this invention. The valve 60 is shown disposed on a copper plate 62. As shown, a center portion 64 of the chill plate has been removed so that the chilling effect of the plate is concentrated at the periphery 66 of the valve. It has been found that using a chill plate of this configuration to chill the valve results in excellent cooling which insures a fine carbide distribution in the surfacing material 68. The center recess helps insure that good electrical contact is made at the periphery of the valve since any crowning of the valve near the center will be in the recess; consequently, the edge of the valve will be in intimate contact with the plate.

The feed mechanism of this invention has been described with respect to a plasma arc torch. However, it can be suitably modified to work with TIG or other forms of arc hard facing techniques well known in the art.

Various modifications and alterations of this invention will become obvious to those skilled in the art without departing from the scope and spirit of this invention.

What is claimed is:

1. A method of hard surfacing a workpiece using a plasma arc torch, comprising the steps of:
    (a) traversing said torch with respect to said workpiece to be surfaced at a first speed;
    (b) initiating and increasing a weld current and plasma arc to a predetermined level over a predetermined period of time;
    (c) initiating feeding into the torch a surfacing material and increasing the feed rate of said surfacing material into said plasma arc during the period of time said weld current is increasing to provide a smooth lead-in on said surfacing;
    (d) establishing a substantially constant welding traversing speed at the same time that said surfacing material feeding begins, said welding speed being substantially less than said first speed;

(e) establishing a steady state weld current and surfacing material feed rate and continuing to feed said material to said plasma arc and maintaining said material feed substantially constant at said steady state weld current, and traversing at said constant welding speed for a predetermined period of time required to surface the desired area of said article;

(g) decreasing said welding current at a predetermined rate upon completion of the surfacing of the desired area of said article;

(g) decreasing the feed rate of said surfacing material while said weld current is decreasing to provide a smooth run-out on said surfacing;

(h) operating said weld current at a decreased rate after the feed of said surfacing material has stopped and simultaneously increasing the traversing speed to said first speed; and (i) extinguishing said weld current.

2. The method of claim 1, further comprising the steps of:
(a) providing a base having a depressed center portion; and
(b) placing said workpiece on said base with only the periphery of said base contacting the workpiece for assuring electrical contact between said workpiece and said base.

3. The method of claim 1 wherein the step of initiating and increasing a weld current includes oscillating said plasma arc for evenly transferring arc heat onto said workpiece.

4. The method of claim 3 wherein said oscillation is performed by applying magnetic field to said arc.

5. A method of applying a hard surfacing material to a workpiece with an electrical plasma arc torch, comprising the steps of:
(a) rotating said workpiece relative to said plasma torch at a first predetermined speed;
(b) establishing a weld current through said plasma torch for directing a plasma arc to said workpiece while said workpiece rotates at said first speed for stabilizing said plasma arc and preventing damage to the surface of said workpiece;
(c) increasing the magnitude of said weld current at a substantially uniform rate to a predetermined maximum level;
(d) reducing the speed of rotation of said workpiece to a second rotational speed substantially less than said first rotational speed before said weld current reaches said maximum level;
(e) feeding said hard surfacing material into said plasma arc at an initial predetermined mass flow rate at substantially the same time that said workpiece begins rotating at said second rotational speed, and increasing said mass flow rate at a substantially constant rate to a second predetermined mass flow rate substantially greater than said initial mass flow rate for initially depositing said hard surfacing material on said workpiece;
(f) continuing to feed said hard surfacing material onto said workpiece at said second mass flow rate and maintaining said current at said predetermined maximum level until said workpiece has completed substantially one revolution with respect to the initial point of material deposition;
(g) reducing said mass flow rate of said hard surfacing material at a substantially linear rate from said second mass flow rate to a rate substantially equal to said first mass flow rate and substantially simultaneously reducing said weld current at a substantially linear rate for blending said weld bead onto said portion of said weld bead;
(h) terminating said mass flow rate of said hard surfacing material upon completion of said blended bead section;
(i) continuing to reduce said current in magnitude after termination of said hard surfacing mass flow rate;
(j) increasing the rotational speed of said workpiece to said first predetermined rotational speed upon terminating said material mass flow rate; and
(k) extinguishing said weld current.

6. The method of claim 5, further comprising the steps of:
(a) providing a base having a depressed center portion; and
(b) placing said workpiece on said base with only the periphery of said base contacting the workpiece for assuring electrical contact between said workpiece and said base.

7. The method of claim 5 wherein the step of initiating and increasing a weld current includes oscillating said plasma arc for evenly transferring arc heat onto said workpiece.

8. The method of claim 7 wherein said oscillation is performed by applying magnetic field to said arc.

* * * * *